United States Patent Office 3,167,761
Patented Jan. 26, 1965

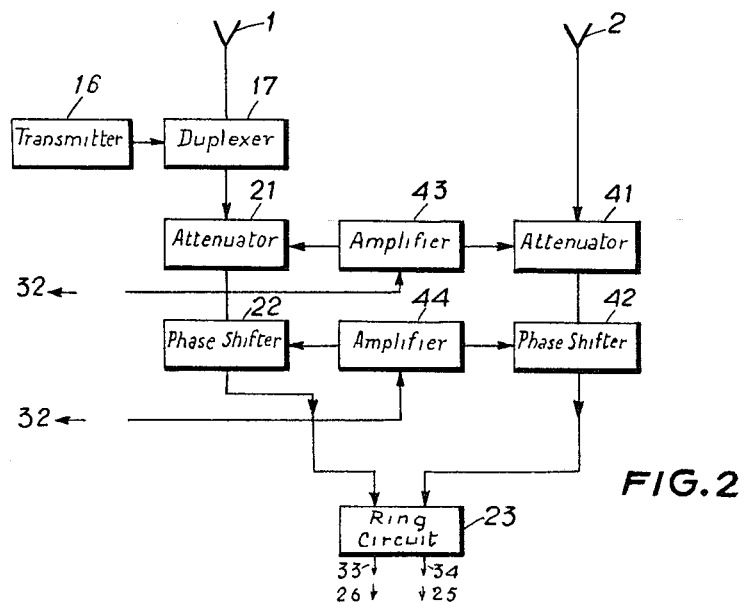
FIG. 2
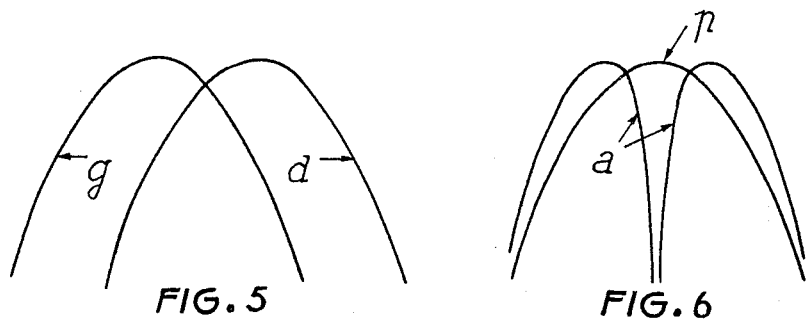
FIG. 5
FIG. 6

---

3,167,761
RADAR SYSTEM TO SUPPRESS INTERFERENCE SIGNALS
Guy Le Parquier, Paris, France, assignor to Compagnie Generale de Telegraphie Sans Fil, a corporation of France
Filed Oct. 4, 1961, Ser. No. 142,866
Claims priority, application France, Oct. 10, 1960, 840,705
5 Claims. (Cl. 343—7)

The present invention relates to radar systems, and more particularly, to a radar receiver adapted to suppress signals from interference sources.

A known noise-suppressing system uses an omni-directional, auxiliary aerial, the gain of which is substantially identical to the means gain of the secondary lobes of the main aerial; a receiver which is identical with that fed by the main aerial is associated with the auxiliary aerial and the signals applied to the indicator are the difference between the video signals supplied by the two receivers.

While this system enables the blurring of the indicator by the diffuse radiation of the main aerial to be avoided, it does not allow the detection of targets, the echoes of which present too low an energy with respect to that of the interference signals.

The invention ensures a satisfactory elimination of interference signals having a duration which is longer than that of the echoes, and avoids, consequently, the above mentioned drawback, in spite of the differences which may subsist between the radiating pattern of the auxiliary aerial and the secondary lobe pattern of the main aerial.

According the the invention, the radar receiver comprises two input channels: one is the main channel and is fed by the normal radar aerial; and the other is the auxiliary channel and receives at least the interference signals to be eliminated. A servosystem comprises an equalizing system which modifies the amplitude of at least one of the two signals respectively propagating in the two input channels and the phase of at least one of these signals so that these two signals should tend towards equality in amplitude and phase, the error signals applied to the control inputs of the equalizing system being subjected to a low pass filtering action preventing them from following the rapid fluctuations of the input signals of the input channels due to the reception of echo pulses.

The difference between the output signals of the input channels is the signal which is ulteriorly detected in order to be applied to the indicator or other suitable apparatus.

The invention will be best understood from the following description and appended drawings, wherein:

FIGS. 2 to 4 illustrate alternative embodiments of the invention;

FIGS. 5 to 8 are graphs illustrating the operation of a receiver according to the embodiment of FIG. 4.

In all the figures, the same elements are designated by the same reference numerals.

Figure 1:
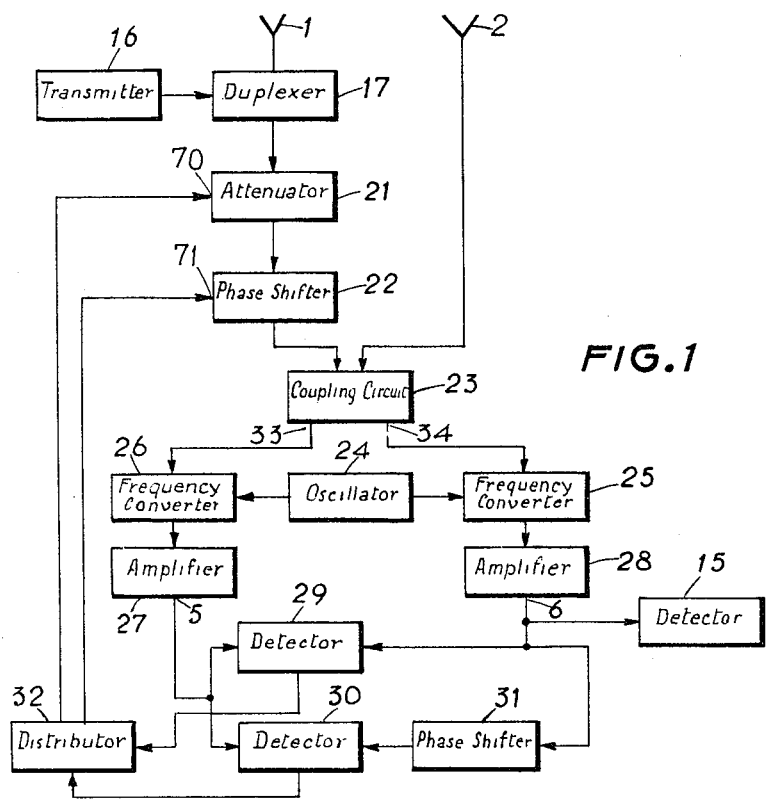
FIG. 1 is a block diagram of an embodiment of the invention.

Referring now to FIG. 1, the block-diagram shown illustrates a receiver according to the invention, which is provided with an omnidirectional auxiliary aerial.

A main directional aerial 1 is fed by a transmitter 16 through a duplexer 17.

An output of duplexer 17 is coupled to the signal input of an attenuator 21 imparting a variable attenuation which is controlled by a signal applied to its control input 70. Attenuator 21 is followed by a phase-shifter 22, which is connected in series therewith and imparts a phase-shift, which is variable in magnitude and sign, and is controlled by a signal applied to its control input 71. Attenuator 21 and phase-shifter 22, which in this example build up the equalizing system, may be, for example of the well known ferrite type.

The output of phase-shifter 22 and of an auxiliary aerial 2 are connected respectively to the two inputs of a microwave coupler 23 of a known type, consisting, for instance, of a ring circuit, delivering on its outputs 33 and 34 respectively the sum and difference of its two input signals.

The output 33 is connected to a frequency converter 26, followed by an amplifier 27, and the output 34 to a frequency converter 25, followed by an amplifier 28. The frequency converters 25 and 26 are fed by the same heterodyne oscillator 24.

The output 5 of amplifier 27 is connected to the respective first inputs of identical amplitude and phase detectors, 29 and 30 of a known type, each of which delivers a continuous output signal, proportional to the product of the amplitudes of its two input signals and of the cosine of their relative phase-shift.

The output 6 of amplifier 28 is connected directly to the second input of amplitude and phase detector 29 and, through a $\pi/2$-phase-shifter 31, to the second input of the amplitude and phase detector 30.

The outputs of detectors 29 and 30 are connected to the two inputs of an error distributor 32, the two outputs of which are connected respectively to the control inputs 70 and 71 of the variable attenuator 21 and of the variable phase-shifter 22.

This error distributor includes, in this embodiment, an electromagnetic rectangular-to-polar coordinate converter, the "$x$" and "$y$" inputs of which are connected to the outputs of the phase and amplitude detectors 29 and 30 respectively, through amplifiers providing, as known in the art, a suitable gain in the negative feed-back loop, and the outputs $\rho$ and $\theta$ of which are respectively connected to the control inputs 70 and 71 of the variable atenuator and variable phase-shifter.

In this embodiment, the inertia of the electromagnetic system is normally sufficient to provide low-pass filtering of the signals applied to the attenuator 21 and to the phase-shifter 22. This low-pass filtering is necessary for the operation of the system as the error signals have to be responsive to the comparatively slow fluctuations of the input signals of the system, which are due to the action of the rotation of the main aerial on the level of the interference signals originating, for example, from a jammer and received by this aerial, but not to the rapid fluctuations due to the reception of the short radar pulses reflected by a target.

The frequency band of the error signal must thus be larger than that necessary for following the above, slow fluctuations (say a few tens of c./s.) and smaller than that necessary for following the above mentioned rapid fluctuatings (say a few hundreds of kc./s.). The upper limit of the error signal frequency band must be comprised between these two values. In this case the upper limit of the error signal may be of a few hundred of cycles per second.

The electromagnetic cartesian-to-polar coordinate converter may thus be substituted by its electronic equivalent, provided low-pass filters are inserted, either at both its inputs, or at both its outputs.

The output 6 of amplifier 28 is also connected to a detector 15 which supplies the detected signals to an indicator or other apparatus not shown in the figure.

According to this embodiment, the high frequency signals received on both aerials are added together and subtracted from one another in the coupling circuit 23, after phase and amplitude adjustment, in phase-shifter 21 and attenuator 22, of the signal received by aerial 1. The sum and difference signals are then collected at the outputs 33 and 34 of the coupling circuit 23. After translation to an intermediate frequency and amplification, the sum signal $$S = I_1 + I_2 = s \sin(\omega t + \sigma)$$

and the difference signal $$D = I_1 - I_2 = d \sin(\omega t + \delta)$$

are respectively collected at the outputs 5 and 6 of the amplifiers 27 and 28: $I_1$ and $I_2$ corresponding to the output signals of the main and of the auxiliary channels, respectively.

At the outputs of the phase and amplitude detectors 29 and 30, there are collected the signals $A = ksd \cos(\delta - \sigma)$ and $B = k s d \sin(\delta - \sigma)$, where $k$ is a constant.

These two signals are applied to a distributor 32 which, in the example described, delivers to the control inputs of attenuator 21 and phase-shifter 22 respectively two error signals which, within given constant factors depending upon the gain of the feed-back loop, are of the form $\rho = sd$ and $\theta = \delta - \sigma$, respectively, $\delta - \sigma$ being expressed by a variable polarity signal. These signals have besides been subjected to the indicated frequency band limitation.

Signals $\rho$ and $\theta$ are respectively applied to attenuator 21 and phase-shifter 22, in the proper direction, i.e. so that through the action of the servo-system the difference between the amplitudes of $I_1$ and $I_2$ and the difference between the phases of $I_1$ and $I_2$ tend towards zero, the system assuming its rest position only when these conditions are satisfied with an approximation depending upon the gain of the feed-back loop.

Under these conditions, the servosystem, in the presence of interference signals, for example from a jammer, tends to control the difference signal detected by detector 15. But if an echo pulse is picked up by the main aerial, the resulting error signal, due to the limitation of the error signal frequency band, cannot modify the adjustment of attenuator 21 and phase-shifter 22 as indicated above, and the difference signal thus collected at the output 6 is detected at 15 and may be used for indicating or other purposes.

For the operation of the receiver illustrated in the block diagram of FIG. 1, it is assumed that the interference signals picked up by the main aerial have a higher energy level than the same signals received by the auxiliary aerial, which condition may be generally satisfied by conveniently selecting the gain of the auxiliary aerial.

It is however possible to overcome this limitation by using a phase shifter and an attenuator in each of the channels preceding the addition and subtraction circuit. This alternative is illustrated in FIG. 2, where the components of the circuit preceding the coupling circuit 23 are illustrated with the addition of a variable attenuator 41 and a variable phase-shifter 42 connected in series between the auxiliary aerial 2 and the coupling circuit 23, and of two amplifiers 43 and 44, each of which has two outputs respectively delivering signals varying in opposite directions. The two outputs of amplifier 43 are respectively connected to the control inputs of the attenuators 21 and 41 and the two outputs of amplifier 44 are respectively connected to the control inputs of the phase-shifters 22 and 42. The output signals $\rho$ and $\theta$ of distributor 32 are applied to the inputs of amplifiers 43, 44 and no longer directly to attenuator 21 and phase-shifter 22. The remainder of the circuit remains unmodified relative to FIG. 1.

The signals delivered by the distributor 32 are of the same form as indicated hereinabove. The output signals of amplifiers 43 and 44 are applied to the attenuators and to the phase-shifters so that the attenuation increases in one channel, when it decreases—or remains stationary— in the other channel, and vice-versa, and that the algebraical phase-shift increases in one channel, when it decreases in the other, and vice-versa.

Figure 3:
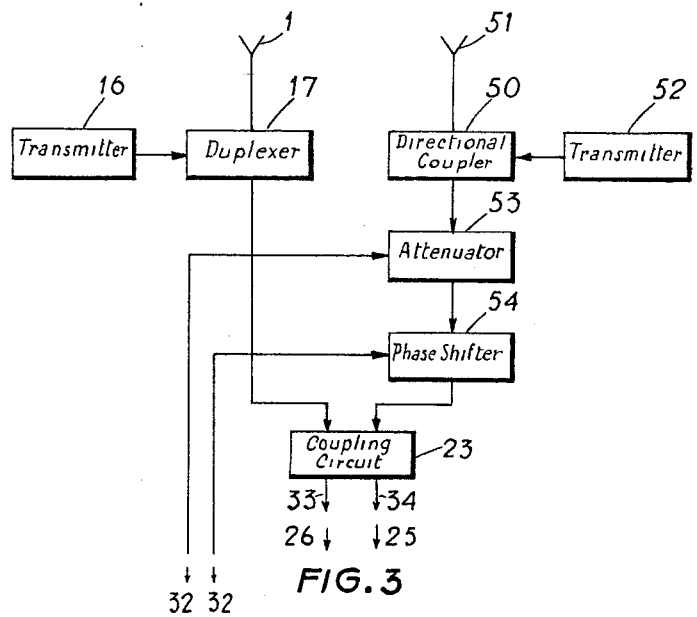

FIG. 3 is an alternative embodiment of the arrangement according to the invention, when a vehicle is used for locating the radar station and a jammer covering the same frequency band, and it is desired to operate both the radar and the jammer simultaneously, i.e. to operate the radar without affecting its operation by one's own jammer operation.

This arrangement is similar to that shown in FIG. 1, except that the jammer transmitter 52 is substituted for the auxiliary aerial 2 and that the variable phase-shifter and attenuator are inserted in the auxiliary channel, instead of the main channel. A directional coupler 50 is inserted between aerial 51 of the jammer unit and the transmitter 52 thereof. This directional coupler feeds, through one of its outputs, an attenuator 53, followed by a phase-shifter 54, the output of which is coupled to one of the inputs of the coupling circuit 23, the other input of the coupling circuit 23 being coupled directly to the duplexer 17. The control signals derived from distributor 32 are applied to the control inputs of attenuator 53 and phase-shifter 54, respectively.

In this case, the energy of the interference signals delivered by the auxiliary channel is always higher than that received by the main channel.

The systems described hereinabove make it possible to detect readily a target, the direction of which, as seen from the radar, differs sufficiently from that of the jammer or another source of interference signals so that the amplitude and phase adjustment effected for the direction of the jammer are not also effective in the direction of the target.

In other words, the detection of the useful targets is very difficult or even impossible, when they are located in a direction such that the source of interference signals is located in the axial zone of the main lobe of the main aerial, when the axis of this lobe is directed towards the target.

This does not hold true, if instead of a substantially omnidirectional auxiliary aerial, an auxiliary aerial is used, the radiating pattern of which presents a very sharp split in a given direction and if this auxiliary aerial is caused to rotate in synchronism with the main aerial, so that the axis of this split coincides with that of the main lobe of the main aerial. Under these conditions, the differential gain between the two patterns varies very rapidly in the neighborhood of the radioelectric axis of the aerial. This enables to eliminate the signals coming from jammers, without affecting the signals coming from targets lying very nearly in the same direction.

Instead of such an aerial system, an equivalent system may be provided wherein the sum and difference signals of a monopulse radar aerial are used, instead of the signals delivered, as in the previously described embodiments, by the main and auxiliary aerials respectively.

FIG. 5 represents both, in decibels, radiating patterns $g$ and $d$ of a monopulse aerial, viz. the left-hand and the right-hand beams.

In FIG. 6, there is shown, also in db, the sum pattern $\rho$ and the difference pattern $a$ which presents a very sharp split in the direction of the maximum of pattern $\rho$.

Monopulse aerial systems comprising two aerial portions and a coupling element supplying the sum and the difference of the signals supplied by the two portions are well known and described for example in "Introduction to Monopulse" by Donald R. Rhodes, McGraw-Hill Book Co. A monopulse aerial of the aforesaid type is, for example, shown in FIG. 1.9 on page 18 of this work.

Figure 4:
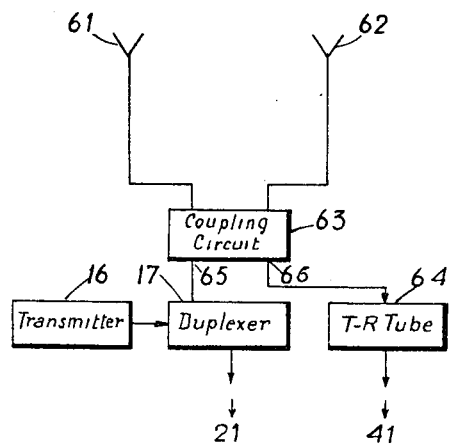

FIG. 4 illustrates another modification of the system according to the invention, which differs from the diagram in FIG. 2 only by the elements preceding the attenuators 21 and 41.

Both portions 61 and 62 of a monopulse aerial, corresponding to the radiating patterns $g$ and $d$ of FIG. 5, feed a coupling circuit 63 delivering on its outputs 65 and 66 respectively the sum and difference signals of the input signals. The output 65 feeds, through duplexer 17, attenuator 21 and the output 66, through a protecting TR-tube 64, the attenuator 41. For the transmission, as well known, the energy delivered by transmitter 16 is equally distributed between portions 61 and 62 of the aerial. The remainder of the circuit is identical to that of FIG. 2.

Figures 7, 8:
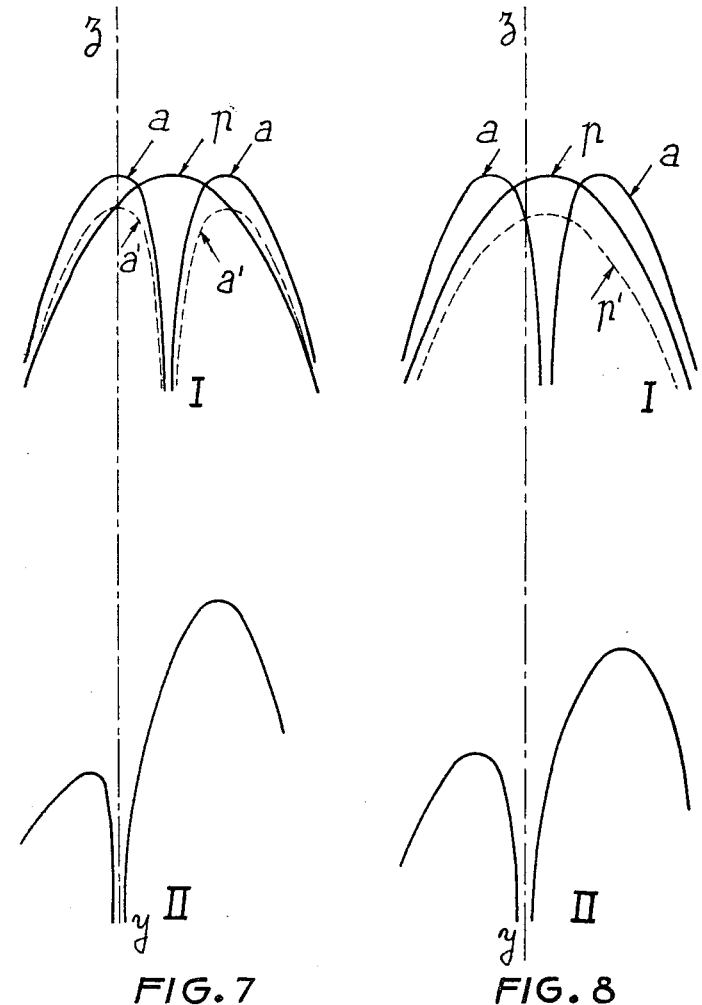

FIGS. 7 and 8 show the method of operation of this arrangement. Patterns $a$ and $\rho$ of FIG. 6 are shown again in parts I of FIGS. 7 and 8, the direction of the source of the interference signals being indicated by the straight line $yz$.

In the case of FIG. 7, it is assumed that the energy received from the source of interference signals by the sum-output of the monopulse aerial is less than that received by the difference output. The opposite assumption is made in FIG. 8.

In the first case the servosystem operates so that the signals collected at the output of the auxiliary input channel, which is fed by the difference output of the monopulse aerial, correspond to an attenuated pattern $a'$ as shown in dotted line (FIG. 7I).

In the second case, the servosystem operates so that the signals collected at the output of the main input channel, which is fed by the sum output of the monopulse aerial, correspond to an attenuated pattern $\rho'$ as shown in dotted line (FIG. 8I).

FIG. 7II and 8II show the respective resulting reception patterns for the difference signals collected at the difference output of the addition and subtraction circuit 23, with a zero gain in the direction of the jammer.

It will be noted that both in the presence, and in the absence of a jammer, the reception pattern corresponding to this difference signal is slightly shifted with respect to the axis of the transmitted beam.

It is to be understood that the invention is not limited to the embodiments described and illustrated, which are given only by way of example.

Thus, a single variable attenuator may be placed in one channel and a single variable phase-shifter in the other channel, the essential requirement being that it should be possible to act on the amplitude of at least one of the signals and on the phase of at least one of the signals, by means of the two error signals suitable for controlling the operation of the equalizer device, so as to cause the output signals of the input channels to tend towards amplitude and phase equality, said error signals being obtained by means of a convenient distributor.

On the other hand, the feedback control system could also operate at an intermediate frequency. However, this solution is less satisfactory for obtaining a good linearity of the control devices.

What is claimed is:

1. A radar receiver comprising: a radar transmitting-receiving aerial; a main input channel fed by the radar transmitting-receiving aerial; an auxiliary substantially omnidirectional aerial; an auxiliary input channel fed by said auxiliary aerial; a variable attenuator, having a control input, inserted in one of said input channels; a variable phase-shifter, having a control input, inserted in one of said input channels; an addition and subtraction circuit having two inputs respectively fed by said two input channels and two outputs feeding respectively a sum channel with a sum signal and a difference channel with a difference signal; means coupled to said difference channel for detecting said difference signal; means coupled to said sum channel and to said difference channel for deriving from said sum signal and from said difference signal a first error signal tending towards zero when the amplitude of said difference signal tends towards zero and a second error signal tending towards zero when the phase-shift between said sum signal and said difference signal tends towards zero and for upwardly limiting the frequency band of said error signals; and means for applying said first error signal to said control input of said variable attenuator and said second error signal to said control input of said variable phase-shifter.

2. A radar receiver comprising: a radar transmitting-receiving aerial; a main input channel fed by the radar transmitting-receiving aerial and comprising a first variable attenuator and a first variable phase-shifter having respective control inputs; an auxiliary substantially omnidirectional aerial; an auxiliary input channel fed by said auxiliary aerial and comprising a second variable attenuator and a second variable phase-shifter having respective control inputs; a first amplifier, having a control input, for delivering two signals, varying in opposite directions, on two outputs respectively coupled to said control inputs of said first and second variable atenuators; a second amplifier, having a control input, for delivering signals, varying in opposite directions, on two outputs respectively coupled to said control inputs of said first and second variable phase-shifters; an addition and subtraction circuit having two inputs respectively fed by said two input channels and two outputs feeding respectively a sum channel with a sum signal and a difference channel with a difference signal; means coupled to said difference channel for detecting said difference signal; means coupled to said sum channel and to said difference channel for deriving from said sum signal and from said difference signal a first error signal tending towards zero when the amplitude of said difference signal tends towards zero and a second error signal tending towards zero when the phase-shift between said sum signal and said difference signal tends towards zero and for upwardly limiting the frequency band of said error signals; and means for applying said first error signal to said control input of said first amplifier and said second error signal to said control input of said second amplifier.

3. In an equipment comprising a jamming transmitter and a radar system including a radar transmitting-receiving aerial, a radar receiver comprising: a main channel fed by the radar transmitting-receiving aerial; an auxiliary channel having an input coupled to said jamming transmitter and comprising a variable attenuator and a variable phase-shifter having respective control inputs; an addition and subtraction circuit having two inputs respectively fed by said two input channels and two outputs feeding respectively a sum channel with a sum signal and a difference channel with a difference signal; means coupled to said difference channel for detecting said difference signal; means coupled to said sum channel and to said difference channel for deriving from said sum signal and from said difference signal a first error signal tending towards zero when the amplitude of said difference signal tends towards zero and a second error signal tending towards zero when the phase-shift between said sum signal and said difference signal tends towards zero and for upwardly limiting the frequency band of said error signals; and means for applying said first error signal to said control input of said variable attenuator and said second error signal to said control input of said variable phase-shifter.

4. In a radar system comprising a transmitting antenna having a predetermined radiation pattern, a radar receiver comprising: a main receiving aerial means, the radiation pattern of which is identical to said predetermined radiation pattern; a main input channel fed by said main aerial; an auxiliary source delivering at least interference signals to be eliminated; an auxiliary input channel fed by said auxiliary source; an equalizing system for variably attenuating the amplitude of at least one of the two signals respectively propagating in said two input channels and for variably phase-shifting at least one said two signals, said equalizing system having two control inputs; an addition and subtraction circuit having two inputs respectively fed by said two input channels and two outputs; a sum channel and a difference channel respectively coupled to said two outputs of said addition and subtraction circuit; a detector fed by said difference channel; and a feedback loop fed by said sum and difference channels and feeding said control inputs of said equalizing system with error signals for substantially providing the phase and amplitude equality of the input signals of said addition and subtraction circuit, said feedback loop comprising low pass filtering means.

5. In a radar system comprising an aerial system of the monopulse type, said aerial system comprising two aerial portions, and a coupling circuit having a sum output and a difference output, said sum output supplying signals corresponding to a sum radiation pattern and said difference output supplying signals corresponding to a difference radiation pattern, and a transmitter feeding said aerial portions to transmit a beam according to said sum radiation pattern, a receiver comprising: a main channel fed by said sum output of said aerial and comprising a first variable attenuator and a first variable phase-shifter having respective control inputs; an auxiliary input channel fed by said difference output of said aerial and comprising a second variable attenuator and a second variable phase-shifter having respective control inputs; a first amplifier, having a control input, for delivering two signals, varying in opposite directions, on two outputs respectively coupled to said control inputs of said first and second variable attenuators; a second amplifier, having a control input, for delivering signals, varying in opposite directions, on two outputs respectively coupled to said control inputs of said first and second variable phase-shifters; an addition and subtraction circuit having two inputs respectively fed by said two input channels and two outputs feeding respectively a sum channel with a sum signal and a difference channel with a difference signal; means coupled to said difference channel for detecting said difference signal; means coupled to said sum channel and to said difference channel for deriving from said sum signal and from said difference signal a first error signal tending towards zero when the amplitude of said difference signal tends towards zero and a second error signal tending towards zero when the phase-shift between said sum signal and said difference signal tends towards zero and for upwardly limiting the frequency band of said error signals; and means for applying said first error signal to said control input of said first amplifier and said second error signal to said control input of said second amplifier.

References Cited by the Examiner
UNITED STATES PATENTS

| | | | |
|---|---|---|---|
| 3,049,703 | 8/62 | Davis | 343—5 |
| 3,098,226 | 7/63 | Revillon | 343—16.1 |

CHESTER L. JUSTUS, *Primary Examiner.*